US009533226B2

(12) United States Patent
Wakeford et al.

(10) Patent No.: US 9,533,226 B2
(45) Date of Patent: *Jan. 3, 2017

(54) DYNAMIC ADJUSTMENT OF DIFFICULTY IN AN ONLINE GAME BASED ON HARDWARE OR NETWORK CONFIGURATION

(71) Applicant: KABAM, INC., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,674

(22) Filed: Dec. 7, 2015

(65) Prior Publication Data
US 2016/0082354 A1 Mar. 24, 2016

Related U.S. Application Data

(63) Continuation of application No. 14/612,268, filed on Feb. 2, 2015, now Pat. No. 9,205,338, which is a continuation of application No. 13/873,104, filed on Apr. 29, 2013, now Pat. No. 8,944,908.

(51) Int. Cl.
A63F 9/24 (2006.01)
A63F 13/58 (2014.01)
A63F 13/67 (2014.01)
A63F 13/358 (2014.01)
A63F 13/77 (2014.01)

(52) U.S. Cl.
CPC .............. A63F 13/58 (2014.09); A63F 13/358 (2014.09); A63F 13/67 (2014.09); A63F 13/77 (2014.09)

(58) Field of Classification Search
CPC ........ A63F 13/58; A63F 13/358; A63F 13/67; A63F 13/77
See application file for complete search history.

(56) References Cited

U.S. PATENT DOCUMENTS 6,896,618 B2 5/2005 Benoy
6,913,536 B2 7/2005 Tomizawa
7,713,118 B2 5/2010 Roemer
(Continued)

FOREIGN PATENT DOCUMENTS

WO 2014210286 12/2014

OTHER PUBLICATIONS

"Difference in Gameplay Mechanics Between Gold, Silver and Bronze" [online], Apr. 2, 2012 [retrieved Jan. 6, 2015]. Retrieved from the Internet <URL:http://forum.bioware.com/topic/309690-difference-in-gameplay-mechanics-between-gold-silver-and-bronze/>, 7 pages.

(Continued)

Primary Examiner — Corbett B Coburn
(74) Attorney, Agent, or Firm — Sheppard Mullin Richter & Hampton LLP

(57) ABSTRACT

A system and methodology for dynamically adjusting the difficulty of a game based on upon the specific hardware configuration and/or network connectivity capabilities available to specific users in connection with the interaction of those users with the game. In exemplary implementations, dynamically adjusting the difficulty of playing a game based on hardware and network connectivity capabilities may be performed by processors executing computer program modules.

30 Claims, 2 Drawing Sheets

(56) References Cited

U.S. PATENT DOCUMENTS

| | | |
|---|---|---|
| 8,147,328 B2 | 4/2012 | Carroll |
| 8,246,466 B2 | 8/2012 | Herrmann |
| 8,255,297 B2 | 8/2012 | Morgenstern |
| 8,287,383 B1 | 10/2012 | Etter |
| 8,292,743 B1 | 10/2012 | Etter |
| 8,296,781 B1 | 10/2012 | Lebaredian |
| 8,328,642 B2 | 12/2012 | Mosites |
| 8,348,747 B2 | 1/2013 | Arezina |
| 8,360,870 B2 | 1/2013 | Herrmann |
| 8,366,550 B2 | 2/2013 | Herrmann |
| 8,388,452 B2 | 3/2013 | Auterio |
| 8,527,332 B2 | 9/2013 | Selby |
| 8,944,908 B1 | 2/2015 | Wakeford |
| 9,205,338 B1 | 12/2015 | Wakeford |
| 2003/0119576 A1 | 6/2003 | McClintic |
| 2003/0119581 A1 | 6/2003 | Cannon |
| 2005/0076002 A1 | 4/2005 | Williams |
| 2005/0113164 A1 | 5/2005 | Buecheler |
| 2005/0192097 A1 | 9/2005 | Farnham |
| 2007/0004496 A1 | 1/2007 | Gordon |
| 2007/0066403 A1 | 3/2007 | Conkwright |
| 2008/0182664 A1 | 7/2008 | Kaplan |
| 2008/0200244 A1 | 8/2008 | Rowe |
| 2008/0234034 A1 | 9/2008 | Tessmer |
| 2008/0266250 A1 | 10/2008 | Jacob |
| 2008/0293466 A1 | 11/2008 | Arakawa |
| 2008/0318668 A1 | 12/2008 | Ching |
| 2009/0051114 A1 | 2/2009 | Robbers |
| 2009/0181771 A1 | 7/2009 | Sogabe |
| 2009/0181774 A1 | 7/2009 | Ratcliff |
| 2010/0144424 A1 | 6/2010 | Rogers |
| 2010/0166065 A1 | 7/2010 | Perlman |
| 2010/0273557 A1 | 10/2010 | Miyaki |
| 2010/0279762 A1 | 11/2010 | Sohn |
| 2010/0304839 A1 | 12/2010 | Johnson |
| 2011/0093361 A1 | 4/2011 | Morales |
| 2011/0106607 A1 | 5/2011 | Alfonso |
| 2011/0312423 A1 | 12/2011 | Mosites |
| 2012/0009997 A1 | 1/2012 | Youm |
| 2012/0150695 A1 | 6/2012 | Fan |
| 2012/0172098 A1 | 7/2012 | Baker |
| 2012/0244950 A1 | 9/2012 | Braun |
| 2012/0322545 A1 | 12/2012 | Arnone |
| 2013/0005437 A1 | 1/2013 | Bethke |
| 2013/0014033 A1 | 1/2013 | Hamick |
| 2013/0066695 A1 | 3/2013 | Just |
| 2013/0079082 A1 | 3/2013 | Bancel |
| 2013/0079145 A1 | 3/2013 | Lam |
| 2013/0085838 A1 | 4/2013 | Tennenholtz |
| 2014/0122720 A1 | 5/2014 | Jung |
| 2014/0128161 A1 | 5/2014 | Latta |
| 2014/0274308 A1 | 9/2014 | Guinn |
| 2014/0358651 A1 | 12/2014 | Koh |
| 2015/0005052 A1 | 1/2015 | Harrington |
| 2015/0011277 A1 | 1/2015 | Wakeford |

OTHER PUBLICATIONS

A Cautious Celebration of Pay-or-Wait to Play Games, URL: http://www.michaelbraun.me/2014/07/a-cautious-celebration-of-pay-or-wait-to-play-games [retrieved Jan. 21, 2016] 3pgs.

DYNAMIC ADJUSTMENT OF DIFFICULTY IN AN ONLINE GAME BASED ON HARDWARE OR NETWORK CONFIGURATION

FIELD OF THE DISCLOSURE

This disclosure relates to a system and method for dynamically adjusting the difficulty of an online game based on information available related to the hardware and/or network configuration used by users in connection with playing the game.

BACKGROUND

Online games can be played on a variety of platforms (e.g., laptop computers, desktop computers, tablets, handhelds, mobile phones, etc.). These devices have various capabilities with respect to computing resources (e.g., processing, storage, communication speed, etc.). Further, the interface devices used by users on these different platforms may have different capabilities and/or efficiencies (e.g., keyboard versus game controller, versus touchscreen, versus keypad, etc.). Users may connect to an online game through different networks, which results in different amounts of network latency for the different users. Although the experience a player has in a game can be dramatically impacted by the specific hardware and network they are using to access the game, traditionally games provide little to no compensation for these differences.

SUMMARY OF THE DISCLOSURE

One aspect of the disclosure relates to a system for dynamically adjusting the difficulty of an online game based upon the specific hardware configuration and/or network connectivity capabilities available to specific users in connection with the interaction of those users with the game. In exemplary implementations, dynamically adjusting the difficulty of playing a game based on hardware and network connectivity capabilities may be performed by processors executing computer program modules. In some implementations, the system may include one or more servers. The server(s) may be configured to communicate with one or more client computing platforms according to a client/server architecture. The users may access the system via the client computing platforms, for instance, to engage in one or more games.

The server(s) may be configured to execute one or more computer program modules to provide one or more games to users (or players). The computer program modules may include one or more of a game module, a user resource determination module, a game difficulty customization module and/or other modules. It is noted that the client computing platforms may include one or more computer program modules that are the same as or similar to the computer program modules of the server(s) to facilitate individualized content made available to the users of online games.

The game module may be configured to execute an instance of the online game to facilitate presentation of the online game to the users. The game module may be configured to implement in-game actions in the instance of the online game in response to action requests for the in-game actions from the users, wherein the users include a first user.

The user resource determination module may be configured to determine hardware and/or network capabilities available to users of the online game. The user resource determination module may be configured to receive capability information based on various information associated with the users and the hardware and network they use to interact with the online game. The user resource determination module may be configured such that the information is obtained in connection with determining the type of client being used to access the game. Various client types may be detected to include, for example, a mobile application on a mobile device or a web browser on a desktop or mobile computer. The user resource determination module may be configured such that the capability information is obtained in connection with determining various classes of information passed from the client device to the server. Various information such as MAC addressing may be used in connection with this determination.

In certain implementations, user resource determinations are made, and a user resource parameter based thereupon is assigned to a user based on one or more of the processing power available to a user in connection with playing a game, the storage available to the user in connection with playing the game, and/or the interface device being used by the user in connection with playing the game. In certain implementations, the display capabilities available to a user in connection with playing the game is used by the user resource determination module to assign a user resource parameter.

The game difficulty customization module may be configured to assign one or more difficulty associated customizations associated with the online game being accessed or to be accessed by the user based on the capability information determined by the user resource determination module. The game difficulty customization module may be configured to determine difficulty customizations associated with games and the customizations may be designed to enhance prospective usage of the online game by the user.

In certain implementations, game difficulty customizations are perceptible to the user and in others they are not. In certain implementations, game difficulty customizations are perceptible to other users playing the game and in others they are not. In certain implementations, game difficulty customizations may include adjusting power of attacks, resistance to attacks, adjustments to speed of game play and/or responsiveness of controlled units. In certain implementations, game difficulty customizations may include adjusting spawn rates or health recharge rates.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural references unless the context clearly dictates otherwise.

DETAILED DESCRIPTION

Figure 1:
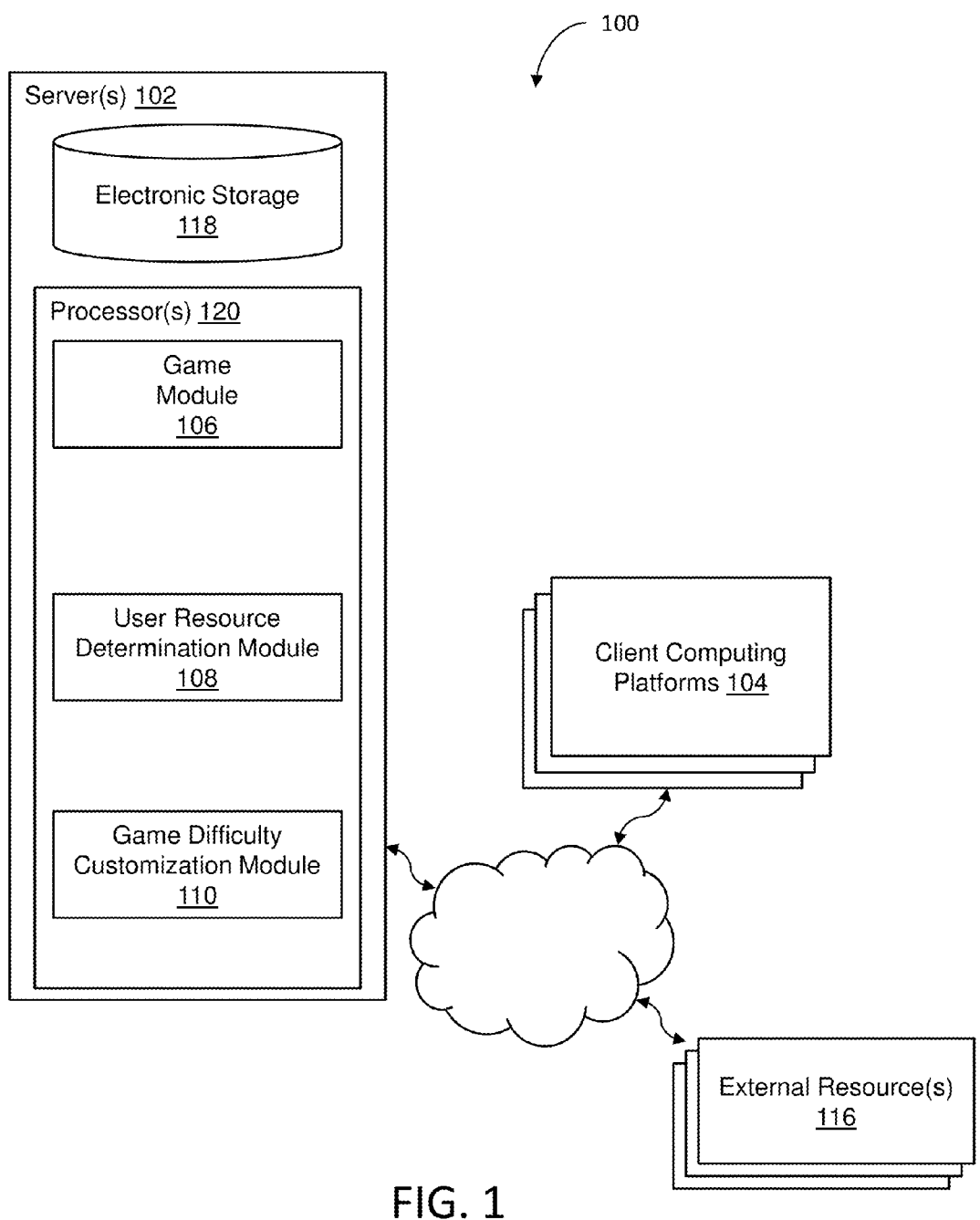
FIG. 1 illustrates a system for dynamically adjusting game difficulty associated with a user based on resources available to that user in connection with gameplay, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network.

In this disclosure, capabilities available to users in connection with game play to include, without limitation, computing resources, network connectivity and game controller functionality, are detected, and various game characteristics relating to the difficulty of game play may be adjusted based on this information. Accordingly, embodiments may be configured for detection of hardware parameters such as device type being used, computing resources available on the device being used, characteristics of the display being used for game play and/or characteristics of one or more interface devices being used for gameplay. Embodiments may further be configured for modification of game difficulty as it applies to a user resulting in a virtual game that may provide more engaging and immersive in-game experiences. In some implementations game difficulty may be impacted through the adjustment of game parameters such as power of attacks, resistance to attacks, speed and/or responsiveness of controlled units and/or spawn rates for units and/or resources as well as health recharge rates and/or other parameters.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program modules. The computer program modules may include one or more of a game module 106, a user resource determination module 108, a game difficulty customization module 110, and/or other modules. As noted, the client computing platform(s) 104 may include one or more computer program modules that are the same as or similar to the computer program modules of the server(s) 102 to facilitate in-game actions.

The game module 106 may be configured to execute an instance of a game to facilitate presentation of the game to users. The game module 106 may be configured to implement in-game actions in the instance of the game, in response to action requests for the in-game actions by the users.

The game may be provided via a virtual space, and may include a plurality of resource types and/or maps. An instance of the virtual space may be executed by computer modules to determine views of the virtual space. The views may then be communicated (e.g., via streaming, via object/ position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102. In implementations, the game module 106 may also be configured to implement the game play difficulty customizations determined for the individual users as described herein.

The user resource determination module 108 may be configured to determine various characteristics associated with hardware and network capabilities available to users in connection with game play. In implementations, user resource determination module 108 is configured to detect and determine characteristics to include the device type being used by the user in connection with game play. This may include, for example, a device type of computer, mobile phone, tablet, netbook, or other device types. User resource determination module 108 may also detect characteristics related to the computing resources available on the device being used by the user. Examples include the amount of memory, the processing power, whether or not there is dedicated graphics processing capability on the device and if so, to what extent.

The user resource determination module 108 may be configured to detect characteristics associated with the display available to the user in connection with game play. Examples include dual screen, single screen, screen size, display frame rate and other display related parameters. In implementations, user resource determination module 108 may be configured to determine the one or more interface devices available to a user in connection with game play. Examples include game controller and type, mouse, keyboard, keypad, touch screen and other devices.

User resource determination module 108 may also be configured to determine various network connectivity parameters associated with the user's connectivity capabilities. Examples include assessing latency and response time associated with connection to server 102 and in connection with game play specifically.

In implementations, the above referenced parameters and others that can be used by user resource determination module 108 in assigning a user resource determination to user, can be determined, for example, by the type of client being used to access the game (e.g. a mobile application on a mobile device versus a web browser on a computer), information passed from the client device to server 102 as well as identifiers such as MAC addresses and others.

The user resource determination module 108 may assess some or all of the network and hardware parameters discussed above as well as others. Assessment may occur in some implementations only prior to initiating game play and in other implementations, assessment may be occur on a periodic basis as, for example, network capabilities such as latency and response time vary over time. Further, in some implementations, all network and hardware capability parameters may be assessed and combined into a single user resource parameter representing an aggregate resource availability value used in adjusting game difficulty as discussed below. Alternatively, in other implementations, various resource parameters may be given more weight and/or specific resource parameters may be mapped to specific game difficulty adjustments (e.g. the unavailability of a game controller may result in more responsiveness being associated with controlled units when controlled by a user that only has a keyboard/mouse available for game play)

The game difficulty customization module 110 may be configured to determine game difficulty characteristics associated with individual users in connection with their participation and/or achievement within the online game. Based on user resource availability as determined by user resource determination module 108, various game parameters may be adjusted by game difficulty customization module 110. In some implementations various parameters impacting the difficulty that the user encounters in game play are adjusted, to include, for example, power of attacks, resistance to attacks made against the user and the speed/responsiveness of controlled units. In some implementations, other difficulty parameters such as spawn rate may be adjusted in connection with a user's game play. This may include, for example, spawn rates associated with resources and/or units of the player, spawn rates associated with resources and/or unites of a user/competitor and/or spawn rates and/or units of non-player characters or forces. In some implementations, game difficulty customization module may adjust, based on user resource availability as determined by user resource determination module 108, health recharge rates associated with the user's game play and other parameters, game content and interactions that affect the difficulty of game play as experienced by a user.

In some implementations, these parameters that impact the game difficulty experienced by the user, are imperceptible to the subject user meaning that he or she is unaware that game difficulty is being/has been adjusted based on the resources available to that user. In other implementations, the user is, in fact, made aware of some or all of the adjustments made to game play as they impact that user. In some embodiments, players playing against the subject user may be made aware of the difficulty adjustments made with respect to other users which are possibly their opponents and in other implementations, these other players are not made aware of difficulty adjustments made with respect to other users.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a netbook, a smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, and 110. Processor 120 may be configured to execute modules 106, 108, and 110 by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, and 110 are illustrated in FIG. 1 as being implemented within a single processing unit, in implementations in which processor 120 includes multiple processing units, one or more of modules 106, 108, and 110 may be implemented remotely from the other modules. The description of the functionality provided by the different modules 106, 108, and 110 described above is for illustrative purposes, and is not intended to be limiting, as any of modules 106, 108, and 110 may provide more or less functionality than is described. For example, one or more of modules 106, 108, and 110 may be eliminated, and some or all of its functionality may be provided by other ones of modules 106, 108, and 110. As another example, processor 120 may be configured to execute one or more additional modules that may perform some or all of the functionality attributed below to one of modules 106, 108, and 110.

Figure 2:
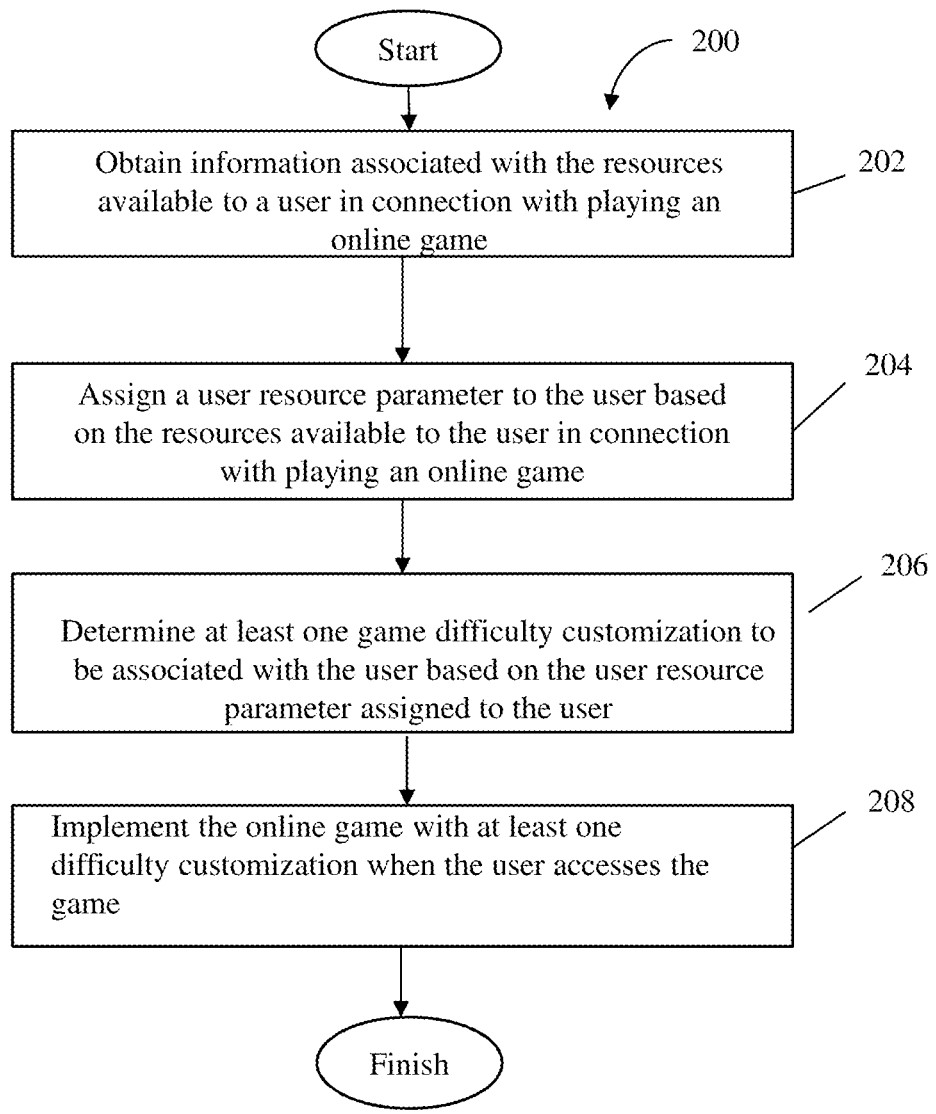
FIG. 2 illustrates a method for dynamically adjusting game difficulty associated with a user based on resources available to that user in connection with gameplay, in accordance with one or more implementations.

FIG. 2 illustrates a method for dynamically adjusting the difficulty of a game based on based on resources available to a user in connection with game play, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information associated with the resources available to a user in connection with game play is obtained. This information may include, for example, one or more parameters relating to hardware capabilities and/or network connectivity capabilities. In some implementations, these capabilities may include a device type such as a computer, mobile phone, tablet, netbook, or other device types. Other characteristics related to the computing resources available on the device being used by the user may also be detected. Examples include the amount of memory, the processing power, whether or not there is dedicated graphics processing capability on the device and if so, to what extent. Display capabilities and characteristics of the interface device available to the user as well as other hardware characteristics may also be considered as discussed above. Information regarding network connectivity capabilities may also be obtained such as network latency, response times, etc. Operation 202 may be performed by a user resource determination module that is the same or similar to user resource determination module 108, in accordance with one or more implementations.

At an operation 204, based on the information received as a result of operation 202, the user is assigned a resource parameter which is indicative of the aggregate hardware and network capabilities available to the user in connection with game play. As discussed above, in some implementations, rather than an aggregate user resource parameter being assigned, it is possible to assign individual resource availability parameters and map them to various aspects of game play which can be made more or less difficult depending on the value of the specific resource availability parameter. Operation 204 may be performed by a user resource determination module that is the same or similar to user resource determination module 108, in accordance with one or more implementations.

At an operation 206, the user resource parameter associated with the user is used to determine at least one game difficulty customization to be associated with the user in connection with game play by that user. Various parameters impacting the difficulty that the user encounters in game play may be designated for adjustment, to include, for example, power of attacks, resistance to attacks made against the user and the speed/responsiveness of controlled units. In some implementations, other difficulty parameters such as spawn rate may be designated for adjustment in connection with a user's game play. This may include, for example, spawn rates associated with resources and/or units of the player, spawn rates associated with resources and/or unites of a user/competitor and/or spawn rates and/or units of non-player characters or forces. In some implementations, game difficulty customizations may be designated for adjustment, based on the user resource parameter, health recharge rates associated with the user's game play and other parameters, game content and interactions that affect the difficulty of game play as experienced by a user. Operation 206 may be performed by a game difficulty customization module that is the same or similar to game difficulty customization module 110, in accordance with one or more implementations.

At an operation 208, an instance of an online game may be executed to facilitate presentation of the game to users. The game, as implemented, may include one or more game difficulty customizations associated with user play based on the user playing the game. Operation 208 may be performed by a game module that is the same as or similar to game module 106, in accordance with one or more implementations.

As discussed above, game difficulty adjustments made in connection with game play as described above may be perceptible to users in some implementations and imperceptible to users in other implementations.

As a result of the teachings of the present invention, the playing field for game players may be leveled as between players that have a substantial difference in the capabilities of hardware and/or network available to them. As a result, users with more limited capabilities can be more competitive in head to head game play and are more likely to participate in various games that they otherwise might not due to the inferiority of their hardware and/or network resources as compared to other players.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online gaming system allowing for customizable interaction, the system comprising:
   one or more processors configured by machine-readable instructions to:
      execute an instance of an online game, and to implement the instance of the online game to facilitate participation of users in the online game, and to implement at least one game difficulty customization determined for individual users such that a first game difficulty customization is implemented in the instance of the online game for a first user;
      obtain a user resource parameter characterizing one or more resources available to the first user to access the online game; and
      determine the first game difficulty customization of the online game for the first user based on the user resource parameter associated with the first user.

2. The system of claim 1 wherein implementation of the first game difficulty customization is imperceptible to the first user during gameplay.

3. The system of claim 1 wherein implementation of the first game difficulty customization is perceptible to the first user during gameplay.

4. The system of claim 1 wherein implementation of the first game difficulty customization is imperceptible to users other than the first user during gameplay.

5. The system of claim 1 wherein implementation of the first game difficulty customization is perceptible to users other than the first user during gameplay.

6. The system of claim 1 where the user resource parameter characterizes a client platform upon which the first user interacts with the online game.

7. The system of claim 1 where the user resource parameter characterizes a capability associated with a client platform upon which the first user interacts with the online game.

8. The system of claim 7 wherein the user resource parameter characterizes processing power available to the first user in connection with the first user's interaction with the online game.

9. The system of claim 7 wherein the user resource parameter characterizes storage available to the first user in connection with the first user's interaction with the online game.

10. The system of claim 7 wherein the user resource parameter characterizes an interface device used by the first user in connection with the first user's interaction with the online game.

11. The system of claim 7 wherein the user resource parameter characterizes a display used by the first user in connection with the first user's interaction with the online game.

12. The system of claim 1 where the user resource parameter characterizes one or more connectivity capabilities through which the first user interacts with the online game.

13. The system of claim 1 wherein the game difficulty customizations comprise adjusting power of attacks or resistance to attacks.

14. The system of claim 1 wherein the game difficulty customizations comprise adjusting speed or responsiveness of controlled units.

15. The system of claim 1 wherein the game difficulty customizations comprise adjusting spawn rates or health recharge rates.

16. A computer-implemented method for in-game customization based upon an assigned user resource parameter, the method being implemented in a computer system that includes one or more physical processors and storage media storing machine-readable instructions, the method comprising:
   obtaining information associated with the resources available to a user in connection with playing an online game, said information comprising said at least one resource characteristic;
   processing said information associated with resources available to said user to assign a user resource parameter to said user;
   determining at least one game difficulty customization to be associated with said user based on said user resource parameter assigned to said user; and implementing an online game with said at least one game difficulty customization when said online game is accessed by said user.

17. The method of claim 16 wherein at least one game difficulty customization is imperceptible to the user during gameplay.

18. The method of claim 16 wherein at least one game difficulty customization is perceptible to the user during gameplay.

19. The method of claim 16 wherein at least one game difficulty customization is imperceptible to users other than the user during gameplay.

20. The method of claim 16 wherein at least one game difficulty customization is perceptible to users other than the user during gameplay.

21. The method of claim 16 where the user resource parameter is determined, at least in part, by the platform upon which the user interacts with the online game.

22. The method of claim 21 wherein the user resource parameter is characterized by the extent of processing power available to the user in connection with the user's interaction with the online game.

23. The method of claim 21 wherein the user resource parameter is characterized by the extent of storage available to the user in connection with the user's interaction with the online game.

24. The method of claim 21 wherein the user resource parameter is characterized by the nature of an interface device used by the user in connection with the user's interaction with the online game.

25. The method of claim 21 wherein the user resource parameter is characterized by the nature of a display used by the user in connection with the user's interaction with the online game.

26. The method of claim 16 where the user resource parameter is characterized by at least one capability associated with the platform upon which the user interacts with the online game.

27. The method of claim 16 where the user resource parameter is characterized by the connectivity capabilities through which the user interacts with the online game.

28. The method of claim 16 wherein said at least one game difficulty customization comprises adjusting power of attacks or resistance to attacks.

29. The method of claim 16 wherein said at least one game difficulty customization comprises adjusting speed or responsiveness of controlled units.

30. The method of claim 16 wherein said at least one game difficulty customization comprises adjusting spawn rates or health recharge rates.

* * * * *